J. G. WEHRLE AND J O. RUBLE.
LOCK FOR TRACTOR STEERING GEAR.
APPLICATION FILED FEB. 14, 1919.
1,373,039.
Patented Mar. 29, 1921.
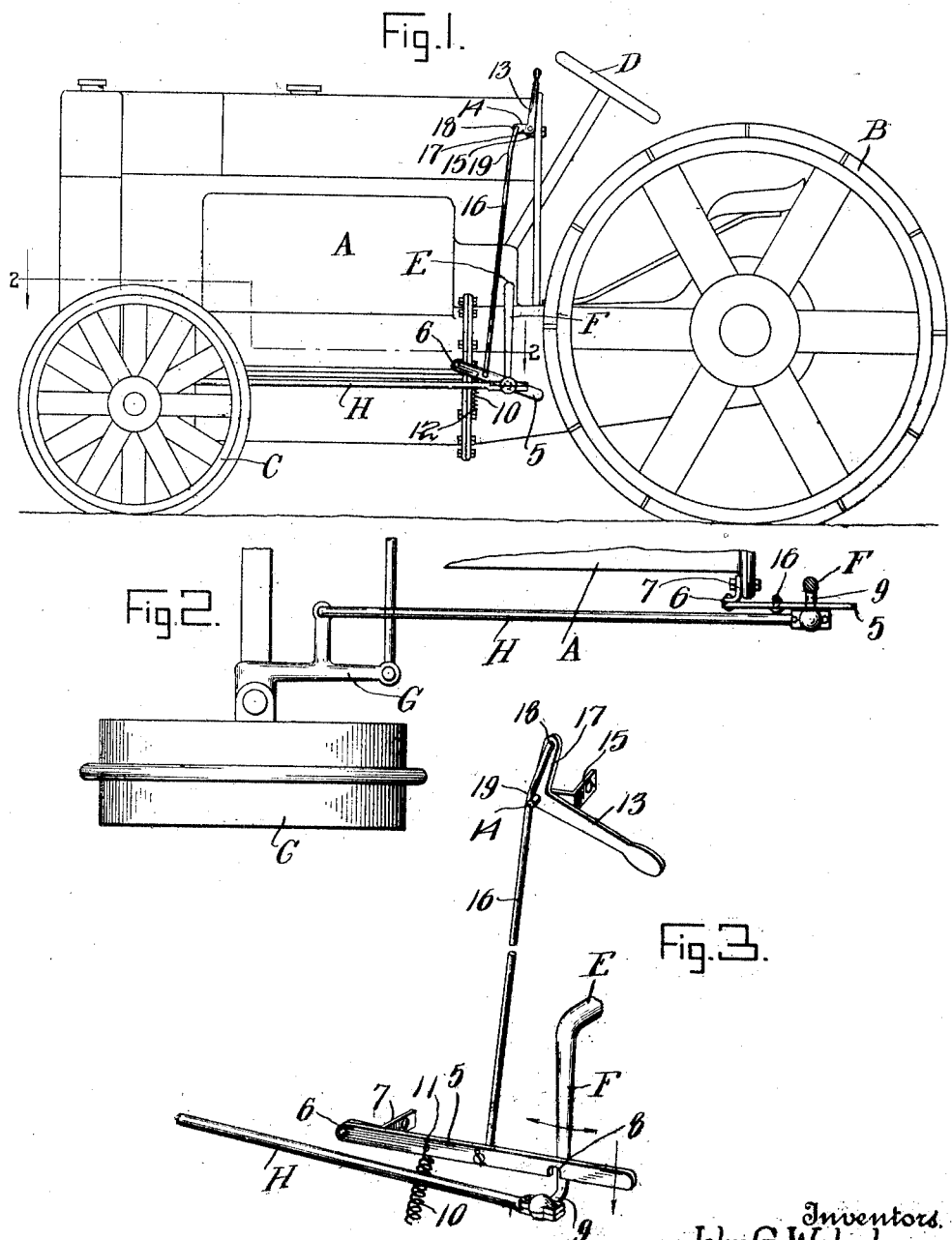
Inventors.
John G. Wehrle
J Otho Ruble.
By Bedford & Doolittle
Attorneys.

UNITED STATES PATENT OFFICE.

JOHN G. WEHRLE AND J OTHO RUBLE, OF WELLMAN, IOWA.

LOCK FOR TRACTOR STEERING-GEAR.

1,373,039.  Specification of Letters Patent.  Patented Mar. 29, 1921.

Application filed February 14, 1919. Serial No. 277,046.

*To all whom it may concern:*

Be it known that we, JOHN G. WEHRLE, a citizen of the United States, residing at Wellman, Washington county, and State of Iowa, and J OTHO RUBLE, a citizen of the United States, residing at Wellman, Washington county, and State of Iowa, have invented and discovered certain new and useful Improvements in Locks for Tractor Steering-Gears, of which the following is a specification.

Our said invention relates to locks for use with motor-driven vehicles, particularly for tractors, to be applied to the steering devices thereof, and its main object is to provide a means whereby the pilot wheels may be held in a position to keep the vehicle headed to travel in a straight path, irrespective of the unevenness of the ground, thereby temporarily relieving the operator of the strain of keeping the vehicle properly headed and permitting him to give attention to other duties. With these and other objects in view, the invention consists in the combination and arrangement of parts hereinafter more fully described in the specification and particularly pointed out in the appended claims, reference being had to the accompanying drawing forming a part thereof, in which like reference characters designate similar parts in the several views of which;

Figure 1 is a side elevation of a tractor showing our invention applied thereto, Fig. 2 a horizontal section of a portion of the device taken on the dash line 2—2 in Fig. 1, and, Fig. 3 a detail perspective view of the device detached.

In the said drawing we have illustrated a well known form of tractor, known as the Fordson, comprising an engine A, traction wheels B and pilot wheels C. Said pilot wheels are steered by means of the steering wheel D connected through a suitable shaft and gearing to rock a horizontally disposed crank-shaft E having a depending crank arm F connected to the usual steering knuckle G by means of a horizontally disposed rod H.

Our invention comprises the attachment consisting of an arm 5 of suitable length, pivoted at 6 to a bracket 7 bolted to the engine crank-case and provided in its under side with a notch 8 adapted to be brought to engage the short horizontal portion 9 of the crank-arm F to prevent it from rocking. When in engagement, the arm is thus held by means of a spring 10 secured thereto at 11 and to the crank-case of the engine A at 12. The said arm 5 is raised out of engagement and held disengaged by a lever 13 mounted on a pivot 14 on a bracket 15 secured to a suitable part of the machine. A rod 16 connects the arm 5 to one arm 17 of the lever 13 as at 18 and has a bend 19 adjacent to the lever 13 which, when said lever is in a position to raise the arm 5, rests against the shaft 14 allowing the pivotal point 18 to go slightly beyond the line of the shaft 14 and the pivotal connection between the rod 16 and arm 5, thereby locking the arm 5 in its raised or disengaged position.

Having thus fully described our said invention, what we claim as new and desire to secure by Letters Patent is:

1. The combination with a vehicle steering mechanism comprising a rock-shaft having an offset approximately parallel with the rock-shaft and manual means for rocking the shaft, of a pivoted latch proportioned and positioned to engage the offset and maintain the rock-shaft against manual motion, a spring adapted to retain the latch in its locked position, an actuating bell crank having a pivot shaft extending therethrough, and a rod connecting said latch with said bell crank formed with a bent portion in its upper end and adapted to engage the said pivot shaft whereby the lever is held in a raised and unlocked position.

2. The combination with a vehicle steering mechanism comprising a rock-shaft having an offset and manual means for rocking the shaft, of a pivoted latch proportioned and positioned to engage the offset and maintain the rock-shaft against rotary movement, and a bell crank pivoted to the frame of the vehicle, a rod connecting the locking lever and the bell crank and provided with a bend adapted to contact with the pivot shaft of the bell crank and allow the latch to be securely held in raised position.

In witness whereof, we have hereunto set our hands and seals at Wellman, Iowa, this 23rd day of January, A. D., nineteen hundred and nineteen.

JOHN G. WEHRLE. [L. S.]
J OTHO RUBLE. [L. S.]

Witnesses:
 FRED C. SCHROEDER,
 JOHN R. MANEY.